April 26, 1949.　　　S. J. LITTLE　　　2,468,504

TERRA-COTTA FLUE LINER CIRCLE CUTTER

Filed May 18, 1948

INVENTOR.
Samuel J. Little
BY Victor J. Evans & Co.
ATTORNEYS

Patented Apr. 26, 1949

2,468,504

UNITED STATES PATENT OFFICE 2,468,504

TERRA-COTTA FLUE LINER CIRCLE CUTTER

Samuel J. Little, Savannah, Ga.

Application May 18, 1948, Serial No. 27,625

3 Claims. (Cl. 125—20.)

This invention relates to cutting tools used primarily for cutting circles or round holes in terra cotta flue linings, pipes, and the like, and in particular a vertically positioned knife adjustably mounted at the end of an arm and with the arm adjustably and pivotally mounted on a stand having a center and a handle wherein with the stand held by one hand the knife may be rotated about the center with the other and the knife will cut a circular opening in a flue lining or device upon which the tool is mounted.

The purpose of this invention is to provide means for manually cutting flue openings in terra cotta lining and the like whereby the openings may readily be cut in the field so that they may be located as desired.

This application is a continuation-in-part of my copending application Serial No. 699,257, filed September 25, 1946, and which has become forfeited.

In forming lateral flue openings in terra cotta linings of chimneys and the like it is difficult to exactly locate the opening until the lining is ready to be installed and this makes it almost impossible to cut the openings for lateral flues in the shop. With this thought in mind this invention contemplates a cutting tool that may be operated by hand so that the flue lining may be fitted in place and the lateral openings cut therein as desired.

The object of this invention is, therefore, to provide a tool with which a mason or the like may form lateral openings in terra cotta flue linings as the tile is installed.

Another object of the invention is to provide a manually actuated flue lining cutting tool with which circular openings may be cut in terra cotta after it is baked and hardened.

Another object of the invention is to provide a circle cutting tool for forming openings in terra cotta in which the tool may be readily adjusted to cut openings of different diameters.

A further object of the invention is to provide a terra cotta flue lining cutter which is of a simple and economical construction.

With these and other objects and advantages in view the invention consists of the new and novel combination, construction, and arrangement of parts as hereinafter more fully described, set forth in the claims appended hereto, and described in the accompanying drawings forming part hereof, wherein:

Figure 1:
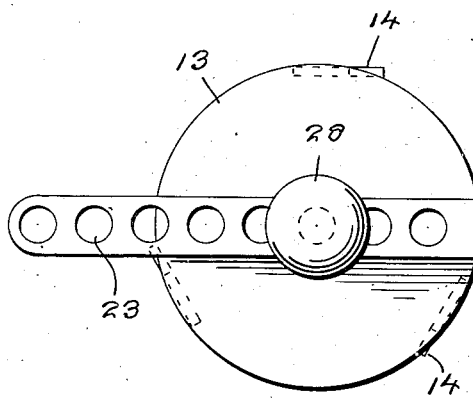
Figure 1 is a plan view of the tool.
Figure 3:
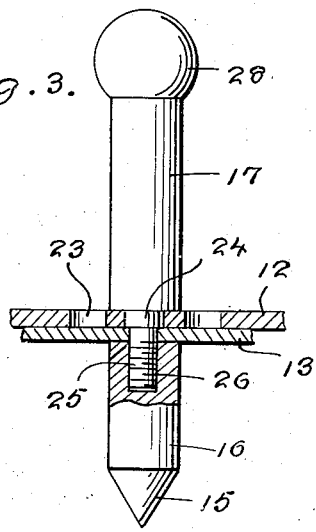
Figure 3 is a vertical section through the center of the tool showing the center post in elevation with part thereof broken away and shown in section.
Figure 2:
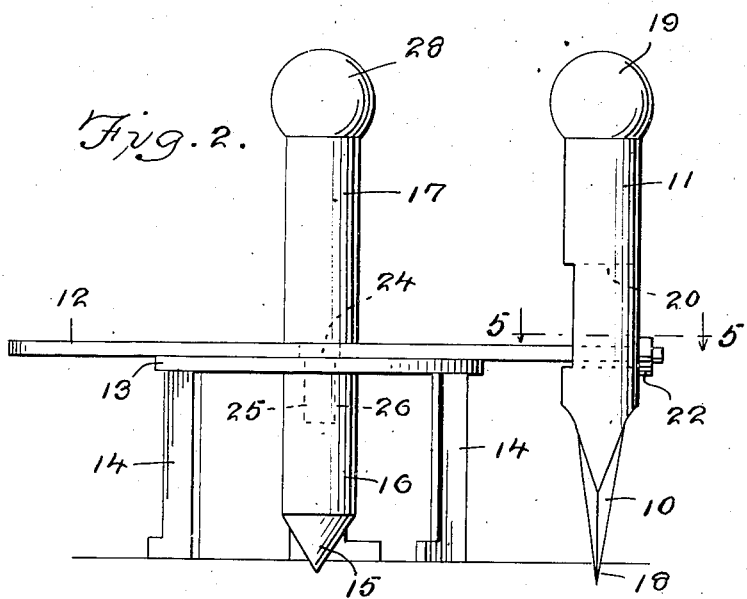
Figure 2 is a view showing a side elevation of the tool.
Figure 4:
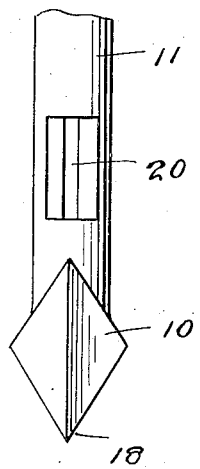
Figure 4 is a front view of the knife with the upper end broken away.
Figure 5:
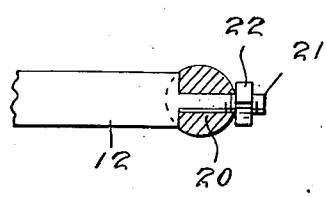
Figure 5 is a sectional plan taken on line 5—5 of Figure 2.

Referring now to the drawings wherein like reference characters denote corresponding parts the terra cotta flue lining cutter of this invention includes a knife 10 at the lower end of a post 11, an arm 12 on the end of which the knife is carried, a disc 13 having legs 14, and a center 15 on the lower end of a post formed with a lower section 16 and an upper section 17.

The knife 10 is substantially diamond-shape in cross section and a cutting point 18 is provided at the lower end. The knife is formed on the lower end of the post 11 and a knob 19 is provided on the upper end by which the post may be gripped by hand. In the intermediate portion of the post 11 is an elongated vertically disposed slot 20 through which a stud 21 on the end of the arm 12 extends and a lock nut 22 is provided on the end of the stud so that the post may be adjusted vertically on the stud and locked in position for cutting.

The arm 12 is provided with a plurality of spaced openings 23 through which it is pivotally mounted on a shoulder 24 of the upper section 17 of the center post. Below the shoulder 24 is a threaded stud 25 that is threaded in an opening 26 in the lower section 16 of the center post, and with the stud 25 positioned in a center opening 27 in the disc 13 the center post may be clamped to the disc with the arm 12 free to rotate about the center. The upper section 17 of the center post is provided with a knob 28 by which it may be held with one hand while the knife is actuated with the other. The distance of the knife from the center may be adjusted by moving the arm 12 from one opening to another so that an opening of substantially any size may be cut. The elevation of the knife may also be adjusted by the lock nut 22 so that a shallow or deep cut may be made.

With the parts arranged in this manner the center of a lateral opening on a terra cotta flue lining may be marked, and then the flue may be placed in a convenient position and the center 15 positioned on the mark. The knob 28 may then be held with one hand while the knife is rotated around the center and the movement of the knife may be continued until the opening is cut.

The tool is adapted to cut openings in terra cotta flue linings either before or after the flue lining is baked and hardened.

It will be understood that modifications may be made in the design and arrangement of the parts without departing from the spirit of the invention.

What is claimed is:

1. A cutter for forming lateral openings in terra cotta flue linings comprising a disc supported on legs and having an opening in the center thereof, a center post mounted in the opening in the center of the disc and having a shoulder of a diameter smaller than that of the post positioned above the disc, an arm having a plurality of spaced openings therein positioned on the disc and rotatably mounted on the shoulder of the post, and a vertically disposed knife carried by the outer end of the arm.

2. A cutting tool for forming openings in flue linings comprising a disc supported on legs and having an opening in the center thereof, a center post mounted in the opening in the center of the disc and having a shoulder of a diameter smaller than that of the post positioned above the disc, an arm having a plurality of spaced openings therein and provided with a threaded stud on the outer end positioned on the disc and rotatably mounted on the shoulder of the post, a knife formed on the lower end of a vertically disposed post, said vertically disposed post having an elongated slot therein through which the threaded stud at the end of the arm extends, and a lock nut on the outer end of said stud.

3. In a circle cutter, the combination, which comprises, a disc, a vertically disposed post having a point providing a center at the lower end and a knob at the upper end on which the disc is mounted, said post comprising an upper section and a lower section with the upper section having a threaded stud on the lower end and the lower section having a socket to receive the stud, said upper section also having a shoulder the diameter of which is less than that of the post between the stud and end of the post, said disc having a centrally disposed opening through which it is mounted on the stud, a cutter carrying arm having a plurality of spaced openings therein through which it is rotatably mounted on the shoulder of the post, said arm having a threaded stud at the outer end, a cutting tool having a knife on the lower end, a hand gripping knob on the upper end and an elongated slot therethrough intermediate of the ends positioned on the threaded stud of the arm, and a lock nut securing the cutting tool on the arm.

SAMUEL J. LITTLE.

No references cited.